United States Patent
Tapscott, Jr.

(10) Patent No.: US 6,799,661 B1
(45) Date of Patent: Oct. 5, 2004

(54) CABLE SNAKE

(76) Inventor: Thomas Gene Tapscott, Jr., 5524 RidgeView Ave., Mira Loma, CA (US) 91752

( * ) Notice: Subject to any disclaimer, the term of this patent is extended or adjusted under 35 U.S.C. 154(b) by 168 days.

(21) Appl. No.: 10/225,075

(22) Filed: Aug. 22, 2002

Related U.S. Application Data

(60) Provisional application No. 60/387,908, filed on Jun. 13, 2002.

(51) Int. Cl.[7] .............................................. F16N 11/10
(52) U.S. Cl. ...................................................... 184/15.1
(58) Field of Search ............................... 184/15.1–15.3, 184/105.1, 55.1; 403/373, 374.1–374.4; 285/94, 353

(56) References Cited

U.S. PATENT DOCUMENTS

| | | | | |
|---|---|---|---|---|
| 4,039,048 A | * | 8/1977 | Safholm | 184/15.1 |
| 4,069,894 A | * | 1/1978 | Black | 184/15.1 |
| 4,324,315 A | * | 4/1982 | Charlton | 184/15.1 |
| 4,415,064 A | * | 11/1983 | Oliemuller | 184/15.1 |
| 4,572,332 A | * | 2/1986 | Pool | 184/15.1 |
| 4,749,059 A | * | 6/1988 | Jonnes et al. | 184/15.1 |
| 4,862,996 A | * | 9/1989 | Chisholm | 184/15.1 |
| 5,107,961 A | * | 4/1992 | Schott et al. | 184/15.1 |
| 5,207,292 A | * | 5/1993 | Pecot et al. | 184/15.1 |
| 5,368,128 A | * | 11/1994 | Waldchen | 184/15.2 |
| 5,560,655 A | * | 10/1996 | Cameron | 285/39 |

* cited by examiner

Primary Examiner—Chong H. Kim
(74) Attorney, Agent, or Firm—Patent & Trademark Services, Inc.; Joseph H. McGlynn

(57) ABSTRACT

A device for lubricating cables having a container in which a cable and oil are placed. Pressurized air is then introduced into the container to lubricate the cable.

9 Claims, 1 Drawing Sheet

CABLE SNAKE

Applicant claims priority of Provisional Ser. No. 60/387,908, filed Jun. 13, 2002.

BACKGROUND OF THE INVENTION

This invention relates, in general, to cables, and, in particular, to a device for lubricating control cables.

DESCRIPTION OF THE PRIOR ART

In the prior art various types of devices have been proposed. For example, U.S. Pat. No. 5,107,961 to Schott et al discloses a fixture for oiling a cable which has a container through which the cable is passed and an oil fitting on the side of the container.

U.S. Pat. No. 4,415,064 to Oliemuller discloses a fixture for oiling a cable which has a container through which the cable is passed and an oil fitting on the side of the container.

U.S. Pat. No. 4,069,894 to Black discloses a fixture for oiling a cable which has a container with a lubricated sponge through which the cable is passed and an oil fitting on the side of the container.

U.S. Pat. No. 5,368,128 to Waldchen discloses a fixture for oiling elevator cable which has a pair of spray pipes on opposite sides of the cable.

SUMMARY OF THE INVENTION

The present invention is directed to a device for lubricating cables having a container in which a cable and oil are placed. Pressurized air is then introduced into the container to force the oil along the cable and lubricate the cable.

It is an object of the present invention to provide a new and improved device for lubricating cables.

It is an object of the present invention to provide a new and improved device for lubricating cables in which pressurized air is used to distribute the oil.

It is an object of the present invention to provide a new and improved device for lubricating cables which is easy to use and inexpensive to manufacture.

These and other objects and advantages of the present invention will be fully apparent from the following description, when taken in connection with the annexed drawings.

DESCRIPTION OF THE PREFERRED EMBODIMENT

Figure 1:
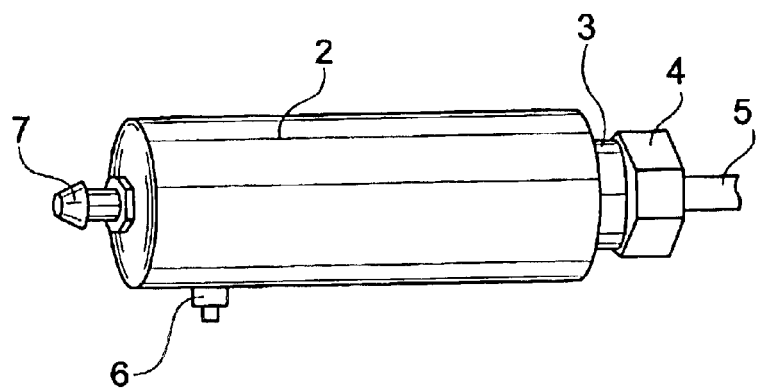
FIG. 1 is a perspective view of the present invention.

Referring now to the drawings in greater detail, FIG. 1 shows the present invention 1, which comprises a hollow housing 2. The housing 2 has a sleeve 3 which has extensions 8, 9 (see FIG. 2) and extension 9 threads into the housing 2. A nut 4 is threaded onto extension 8.

The sleeve 3 and the nut 4 receive the cable 5, 14 and allow it to be passed into the inside of the container 2. Cable 5, 14 is a conventional control cable which comprises a cable housing 5 which receives the cable 14. The cable 14 moves longitudinally within the cable housing 5 to control various items such as, but not limited to, a throttle on a vehicle. It should be noted that the cable 5, 14 is shown merely for illustrational purposes, and is not the only type of cable that could be used with the present invention. The present invention could be used with a variety of cables such as, but not limited to, dirt and street bike cables, lawn equipment, bicycles, jet skies, snow mobiles, boats, car and truck cables.

Secured to one end of the housing 2 is an air tank valve 7. The valve 7 can be any conventional valve which will allow connection to a source of air such as, but not limited to, an air compressor or hand air pump. Also, removable plug 6 is threaded into the housing 2 on a side of the housing.

Figure 2:
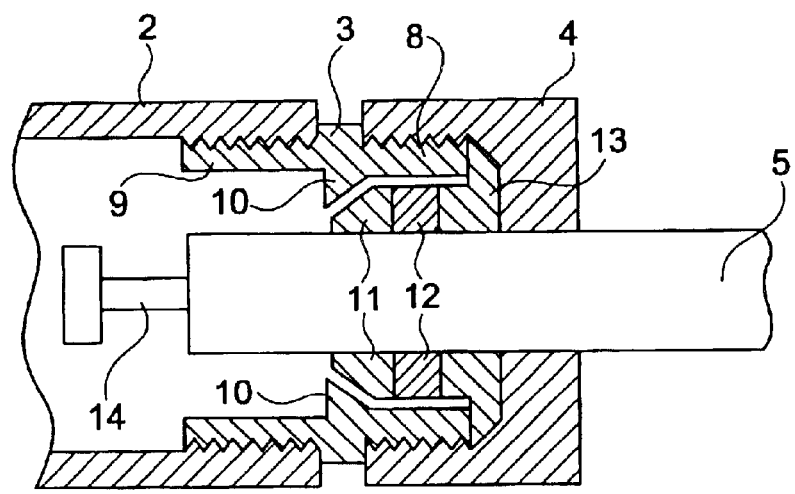
FIG. 2 is a partial cross-sectional view of the present invention.

As shown in FIG. 2, the extension 9 has external threads that engage internal threads in the end of housing 2. The sleeve 3 has a projection 10 which has a tapered surface on an internal portion of the sleeve. Locking device 11, which surrounds the outer surface of cable housing 5, has a complimentary tapered surface that engages and holds the outer surface of the cable housing when the nut 4 is tightened, which compresses 11 to retain the cable in the housing 2. A pressure member 13 engages the nut 4. The seal 12 is disposed between locking device 11 and pressure member 13. The seal 12 is compressed by pressure from nut 4 through pressure member 13. Extension 8 has external threads which cooperate with internal threads on nut 4.

In order to use the present invention, a user would pass the cable 5, 14 through the nut 4, pressure member 13, seal 12 and locking device 11. Next, the nut 4 would be tightened and pressure member 13 would compress seal 12 and, at the same time, force the slanted surface on locking device 11 against the slanted surface on projection 10. This would seal the outer surface of cable housing 5 so oil cannot leak from inside the housing 2 along the outer surface of cable housing 5, and at the same time, compress locking element 11 against 5 to hold the cable in housing 2. Next, the plug 6 would be removed from the housing 2 and oil would be placed into the container or housing 2, using any conventional means, and the plug 6 would be replaced. Then, a source of air would be attached to valve 7 and air would be introduced into the container 2 under pressure. The air,pressure would force the oil between the outer surface of cable 14 and the inner surface of the cable housing 5. When the user sees oil exiting from the end of the cable housing 5, which is outside the housing or container 2, the cable is completely oiled and can be removed from the container 2.

Figure 3:
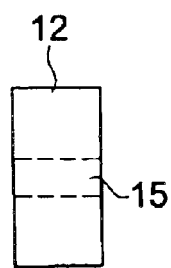
FIG. 3 is a side view of one of the seals that can be used with the present invention.
Figure 4:
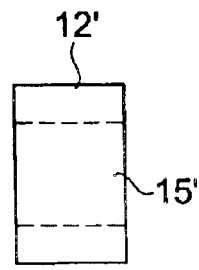
FIG. 4 is a side view of another of the seals that can be used with the present invention.

FIGS. 3 and 4 show two different seal rings 12, 12'. The only difference between these two seals is the diameter of the aperture 15, 15'. Aperture 15' is larger than aperture 15 to accommodated larger diameter cable housings 5.

Using the present invention 1, the entire cable will be lubricated helping to remove dirt and grime that may have built up on the cable. With regular oiling new cables will last for years. By using the present invention on old cables, the cables will be freed from dirt and grime, and rust can be easily removed once the cables are oiled. This is especially important if the old cable is no longer being produced.

Although the Cable Snake and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A device for oiling cables, said device comprising:

a container, said container having an outside surface, an inside surface and ends, means adjacent one of said ends for introducing at least a portion of a cable into said container and retaining said at least a portion of said cable therein, means for introducing a lubricant into said container, means for introducing air under pressure into said container, and wherein said means for retaining said at least a portion of said cable comprises a sleeve secured to one of said ends of said container, and means secured to said sleeve for engaging an outer surface of said at least a portion of said cable for retaining said at least a portion of said cable to said sleeve, and wherein said sleeve has two extensions, one of said extensions engaging said container, and another of said projections receiving a nut, and wherein said sleeve has a projection extending from an inner surface of said sleeve, and a locking device surrounds said at least a portion of said cable, and said locking device has a surface which engages said projection, and a seal is interposed between said locking device and said nut.

2. The device as claimed in claim 1, wherein said sleeve has a projection extending from an inner surface of said sleeve, and a locking device surrounds said at least a portion of said cable, and said locking device has a surface which engages said projection.

3. The device as claimed in claim 2, wherein said projection and said locking device have complimentary slanted surfaces.

4. The device as claimed in claim 1, wherein said two extensions are threaded.

5. The device as claimed in claim 1, wherein said seal has an aperture means for receiving said at least a portion of said cable.

6. The device as claimed in claim 1, wherein a pressure member is interpose between said seal and said nut.

7. The device as claimed in claim 1, wherein said means for introducing a lubricant into said container comprises an aperture extending from said outside surface through said inside surface, and a removable plug in said aperture.

8. The device as claimed in claim 1, wherein said means for introducing air under pressure into said container is a valve.

9. The device as claimed in claim 1, wherein said valve is positioned on one of said ends of said container.

* * * * *